(12) United States Patent
Howard et al.

(10) Patent No.: US 12,172,149 B2
(45) Date of Patent: Dec. 24, 2024

(54) TRI-METAL PGM CATALYSTS FOR GASOLINE ENGINE EXHAUST GAS TREATMENTS

(71) Applicants: Johnson Matthey Public Limited Company, London (GB); Johnson Matthey (Shanghai) Chemicals Limited, Shanghai (CN)

(72) Inventors: Michael Howard, Wayne, PA (US); Dongxia Liu, Wayne, PA (US); Dongsheng Qiao, Shanghai (CN); Zhou Shang, Shanghai (CN); Maria Vlachou, Reading (GB); Xuan Xu, Shanghai (CN)

(73) Assignees: JOHNSON MATTHEY PUBLIC LIMITED COMPANY, London (GB); JOHNSON MATTHEY (SHANGHAI) CHEMICALS COMPANY, Shanghai (CN)

( * ) Notice: Subject to any disclaimer, the term of this patent is extended or adjusted under 35 U.S.C. 154(b) by 161 days.

(21) Appl. No.: 17/452,472

(22) Filed: Oct. 27, 2021

(65) Prior Publication Data

US 2022/0134314 A1    May 5, 2022

Related U.S. Application Data

(60) Provisional application No. 63/198,707, filed on Nov. 6, 2020.

(30) Foreign Application Priority Data

Oct. 30, 2020   (CN) .......................... 202011189429.1

(51) Int. Cl.
*F01N 3/28* (2006.01)
*B01D 53/94* (2006.01)
(Continued)

(52) U.S. Cl.
CPC .......... *B01J 23/464* (2013.01); *B01D 53/945* (2013.01); *B01D 53/9468* (2013.01);
(Continued)

(58) Field of Classification Search
CPC .... B01D 2255/1021; B01D 2255/1023; B01D 2255/1025; B01D 2255/407;
(Continued)

(56) References Cited

U.S. PATENT DOCUMENTS

| 4,369,132 A | 1/1983 | Kinoshita |
| 4,675,308 A | 6/1987 | Wan |

(Continued)

FOREIGN PATENT DOCUMENTS

| CN | 103189138 A | 7/2013 |
| CN | 103201032 A | 7/2013 |

(Continued)

OTHER PUBLICATIONS

Hu et al., "Performance and Structure of Pt—Rh Three-Way Catalysts: Mechanism for Pt/Rh Synergism", Journal of Catalysis, 174, 1998, 13-21.
(Continued)

*Primary Examiner* — Phutthiwat Wongwian
*Assistant Examiner* — Diem T Tran
(74) *Attorney, Agent, or Firm* — Ni Yan

(57) ABSTRACT

A three-way catalyst article, and its use in an exhaust system for internal combustion engines, is disclosed. The catalyst article for treating exhaust gas comprising: a substrate comprising an inlet end and an outlet end with an axial length L; a first catalytic region comprising a first platinum group metal (PGM) component, wherein the first PGM component comprises Rh and Pt; a second catalytic region comprising a second PGM component, wherein the second
(Continued)

PGM component comprises Pd; and wherein the first PGM component has a Pt to Rh ratio of at least 1:20.

20 Claims, 3 Drawing Sheets

(51) Int. Cl.
  *B01J 23/00* (2006.01)
  *B01J 23/10* (2006.01)
  *B01J 23/42* (2006.01)
  *B01J 23/44* (2006.01)
  *B01J 23/46* (2006.01)
  *B01J 35/00* (2006.01)
  *B01J 35/40* (2024.01)
  *B01J 37/03* (2006.01)
  *F01N 3/10* (2006.01)

(52) U.S. Cl.
  CPC ........ *B01D 53/9472* (2013.01); *B01J 23/002* (2013.01); *B01J 23/10* (2013.01); *B01J 23/42* (2013.01); *B01J 23/44* (2013.01); *B01J 35/19* (2024.01); *B01J 35/40* (2024.01); *B01J 37/038* (2013.01); *F01N 3/101* (2013.01); *F01N 3/2803* (2013.01); *B01D 2255/1021* (2013.01); *B01D 2255/1023* (2013.01); *B01D 2255/1025* (2013.01); *B01D 2255/9022* (2013.01); *B01D 2255/9032* (2013.01); *B01D 2255/9035* (2013.01); *B01D 2255/908* (2013.01); *F01N 2370/02* (2013.01)

(58) Field of Classification Search
  CPC .... B01D 2255/9022; B01D 2255/9032; B01D 2255/9035; B01D 2255/908; B01D 2258/014; B01D 53/945; B01D 53/9454; B01D 53/9468; B01D 53/9472; B01J 23/002; B01J 23/10; B01J 23/42; B01J 23/44; B01J 23/464; B01J 35/0006; B01J 35/023; B01J 35/04; B01J 37/0215; B01J 37/038; F01N 2370/02; F01N 3/101; F01N 3/2803; Y02T 10/12
  See application file for complete search history.

(56) References Cited

U.S. PATENT DOCUMENTS

| | | | |
|---|---|---|---|
| 4,678,770 | A | 7/1987 | Wan |
| 4,904,633 | A | 2/1990 | Ohata |
| 4,963,521 | A | 10/1990 | Engler |
| 5,275,997 | A | 1/1994 | Ganguli |
| 5,286,699 | A | 2/1994 | Ohata |
| 5,376,610 | A | 12/1994 | Takahata |
| 6,596,243 | B1 | 7/2003 | Fujii |
| 6,692,712 | B1 | 2/2004 | Andersen |
| 6,806,225 | B1 | 10/2004 | Ikeda |
| 7,276,212 | B2 | 10/2007 | Hu |
| 7,329,629 | B2 | 2/2008 | Gandhi |
| 7,341,975 | B2 | 3/2008 | Iwakuni |
| 7,608,561 | B2 | 10/2009 | Miyoshi |
| 7,737,077 | B2 | 6/2010 | Kitamura |
| 7,758,834 | B2 | 7/2010 | Chen |
| 7,759,283 | B2 | 7/2010 | Yamato |
| 7,795,172 | B2 | 9/2010 | Foong |
| 7,846,863 | B2 | 12/2010 | Taki |
| 7,846,865 | B2 | 12/2010 | Yamato |
| 7,922,988 | B2 | 4/2011 | Deeba et al. |
| 7,998,896 | B2 | 8/2011 | Kitamura |
| 8,007,750 | B2 | 8/2011 | Chen |
| 8,071,502 | B2 | 12/2011 | Shimizu |
| 8,080,494 | B2 | 12/2011 | Yasuda |
| 8,158,552 | B2 | 4/2012 | Hori |
| 8,168,560 | B2 | 5/2012 | Taki |
| 8,309,488 | B2 | 11/2012 | Kitamura |
| 8,496,899 | B2 | 7/2013 | Imai |
| 8,551,908 | B2 | 10/2013 | Satou |
| 8,617,496 | B2 | 12/2013 | Wei |
| 8,679,411 | B2 | 3/2014 | Akamine |
| 8,713,921 | B2 | 5/2014 | Akamine |
| 8,828,343 | B2 | 9/2014 | Liu |
| 8,833,064 | B2 | 9/2014 | Galligan |
| 8,927,454 | B2 | 1/2015 | Itou |
| 8,975,204 | B2 | 3/2015 | Hori |
| 9,266,092 | B2 | 2/2016 | Arnold |
| 9,440,223 | B2 | 9/2016 | Aoki |
| 9,517,462 | B2 | 12/2016 | Roesch et al. |
| 9,550,176 | B2 | 1/2017 | Sato |
| 9,579,633 | B2 | 2/2017 | Suzuki |
| 9,656,209 | B2 | 5/2017 | Chang |
| 9,707,545 | B2 | 7/2017 | Felix |
| 10,603,655 | B2 | 3/2020 | Chandler |
| 10,753,248 | B2 | 8/2020 | Hirota |
| 10,773,209 | B2 | 9/2020 | Liu |
| 10,987,658 | B2 | 4/2021 | Camm |
| 11,117,097 | B2 | 9/2021 | Martin |
| 11,141,697 | B2 | 10/2021 | Chen |
| 2001/0046941 | A1 | 11/2001 | Mussmann et al. |
| 2004/0001781 | A1 | 1/2004 | Kumar et al. |
| 2009/0175773 | A1 | 7/2009 | Chen et al. |
| 2013/0058848 | A1* | 3/2013 | Nunan ............... B01D 53/9477 422/168 |
| 2015/0266014 | A1 | 9/2015 | Xue et al. |
| 2016/0199816 | A1* | 7/2016 | Matsueda ............. B01J 35/006 502/303 |
| 2018/0169624 | A1 | 6/2018 | Chandler |
| 2018/0178198 | A1 | 6/2018 | Deeba et al. |
| 2018/0236401 | A1 | 8/2018 | Chinzei et al. |
| 2018/0311646 | A1 | 11/2018 | Chandler |
| 2019/0091662 | A1 | 3/2019 | Camm et al. |
| 2019/0111389 | A1 | 4/2019 | Camm et al. |
| 2020/0102868 | A1* | 4/2020 | Fujimori .................. B01J 23/42 |
| 2020/0347763 | A1 | 11/2020 | Liu |
| 2021/0262371 | A1 | 8/2021 | Chen |
| 2022/0055021 | A1 | 2/2022 | Liu |
| 2022/0072514 | A1 | 3/2022 | Chandler |
| 2022/0072515 | A1 | 3/2022 | Jing |

FOREIGN PATENT DOCUMENTS

| | | | |
|---|---|---|---|
| CN | 208302793 U | 1/2019 | |
| CN | 109894113 A | 6/2019 | |
| CN | 109899138 A | 6/2019 | |
| CN | 110536740 A | 12/2019 | |
| GB | 2560939 A | * 10/2018 | ......... B01D 53/9422 |
| JP | 2018143935 | * 9/2018 | |
| WO | 2009/089151 A1 | 6/2009 | |
| WO | WO 2012156883 | * 11/2012 | |

OTHER PUBLICATIONS

Oh et al., "Platinum-rhodium synergism in three-way automotive catalysts"—Journal of Catalysis, 98, 1986, 178-190.
Tau et al., "Reaction-Driven Restructuring of Rh—Pd and Pt—Pd Core-Shell Nanoparticles", Science. vol. 322, 2008, 932-934.
Buwono et al., "Redox Dynamics of Rh Supported on ZrP2O7 and ZrO2 Analyzed by Time-Resolved In Situ Optical Spectroscopy", J. Phys.Chem. C. 2017, 17982-17989.

* cited by examiner

TRI-METAL PGM CATALYSTS FOR GASOLINE ENGINE EXHAUST GAS TREATMENTS

FIELD OF THE INVENTION

The present invention relates to a catalyzed article useful in treating exhaust gas emissions from gasoline engines.

BACKGROUND OF THE INVENTION

Internal combustion engines produce exhaust gases containing a variety of pollutants, including hydrocarbons (HCs), carbon monoxide (CO), and nitrogen oxides ("$NO_x$"). Emission control systems, including exhaust gas catalytic conversion catalysts, are widely utilized to reduce the amount of these pollutants emitted to atmosphere. A commonly used catalyst for gasoline engine exhaust treatments is the TWC (three way catalyst). TWCs perform three main functions: (1) oxidation of CO; (2) oxidation of unburnt HCs; and (3) reduction of $NO_x$.

Palladium (Pd) and rhodium (Rh) have been widely used in TWC formulations to reduce harmful emissions in gasoline vehicles. However, in recent years, these precious metal prices have climbed up to be even more precious, due to rising demand in the market. On the other hand, tighter and tighter environmental regulations worldwide have forced automobile industries to put even more precious metals into their catalytic converters.

In the meantime, platinum (Pt) has become a more and more attractive candidate for gasoline applications due to its relatively cheaper price. In the last 12 months (from September 2020, according to http://www.platinum.matthey.com), the average prices of Pt, Pd, Rh were about $888, $2059, and $8468 dollars/Oz respectively. Thus, there are huge financial incentives on how to introduce Pt into catalyst formulations, to at least partially replace Pd and/or Rh while hoping to maintain comparable catalyst performances.

In this invention, through intensive research, inventors have not only successfully developed and tested cost-effective novel catalyst designs but also, surprisingly, to be able to achieve comparable and even significantly improved performances (e.g., improved $NO_x$ emission reduction performances).

SUMMARY OF THE INVENTION

One aspect of the present disclosure is directed to a catalytic article for treating exhaust gas comprising: a substrate comprising an inlet end and an outlet end with an axial length L; a first catalytic region comprising a first platinum group metal (PGM) component, wherein the first PGM component comprises Rh and Pt; a second catalytic region comprising a second PGM component, wherein the second PGM component comprises Pd; and wherein the first PGM component has a Pt to Rh ratio of at least 1:20 by weight.

The invention also encompasses an exhaust system for internal combustion engines that comprises the three-way catalyst component of the invention.

The invention also encompasses treating an exhaust gas from an internal combustion engine, in particular for treating exhaust gas from a gasoline engine. The method comprises contacting the exhaust gas with the three-way catalyst component of the invention.

BRIEF DESCRIPTION OF THE DRAWINGS

FIG. 1b depicts a variation of FIG. 1a.

FIG. 2b depicts a variation of FIG. 2a.

FIG. 3b depicts a variation of FIG. 3a.
FIG. 3c depicts a variation of FIG. 3a.
FIG. 3d depicts a variation of FIG. 3a.

DETAILED DESCRIPTION OF THE INVENTION

Figure 1A:
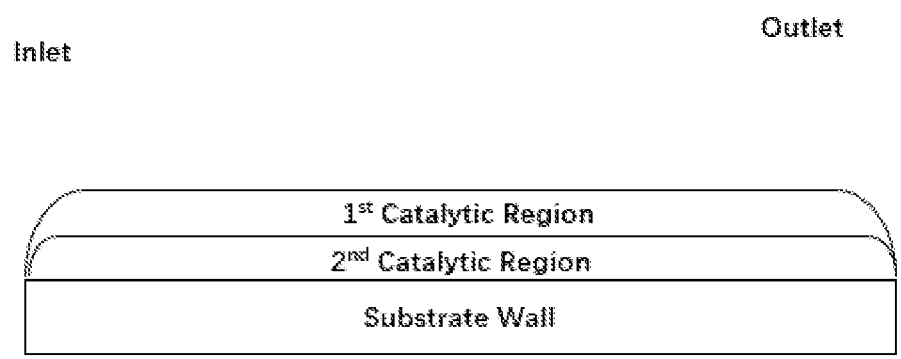
FIG. 1a shows one embodiment according to the present invention, the first catalytic region extends 100% of the axial length L, as top layer; the second catalytic region extends 100% of the axial length L, as bottom layer.
Figure 1B:
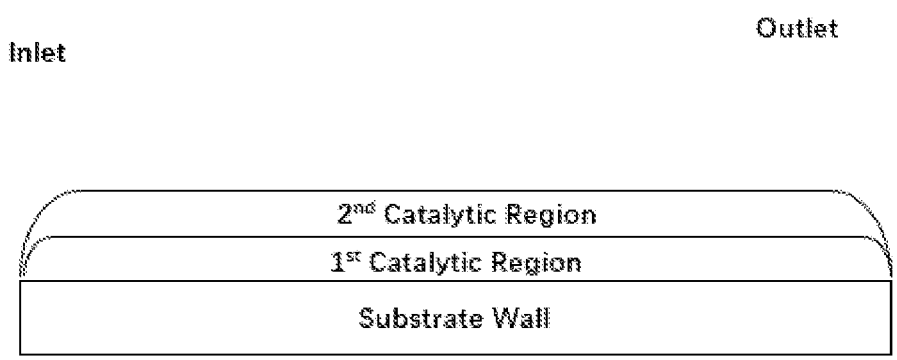

The present invention is directed to catalytic treatment of combustion exhaust gas, such as that produced by gasoline and other engines, and to related catalysts compositions, catalytic articles, and systems. More specifically, this invention relates to cost effective approaches in novel TWC designs through optimized Pt, Pd, Rh ratio and range control compared with traditional Pd/Rh TWC catalyst and simultaneous treatment of $NO_x$, CO, and HC in a vehicular exhaust system.

One aspect of the present disclosure is directed to a catalytic article for treating exhaust gas comprising: a substrate comprising an inlet end and an outlet end with an axial length L; a first catalytic region comprising a first platinum group metal (PGM) component, wherein the first PGM component comprises Rh and Pt; a second catalytic region comprising a second PGM component, wherein the second PGM component comprises Pd; and wherein the first PGM component has a Pt to Rh ratio of at least 1:20 by weight.

Through intensive research, the inventors have found that by partial replacement of Pd and/or Rh with Pt and under a suitable Pt/Pd replacement ratio and a optimized Pt/Rh ratio in the TWC catalyst, not only the PGM cost is reduced significantly, but also these formulations have demonstrated excellent catalytic properties (E.g., see Examples 1-4 and Tables 2, 3, 5, and 7).

First Catalytic Region

In some embodiments, the first PGM component can have a Pt to Rh ratio of at least 1:15; preferably at least 1:10; more preferably at least 1:8, 1:6, 1:5, or 1:2. Alternatively, in certain embodiments, the first PGM component can have a Pt to Rh ratio of 20:1 to 1:20, 15:1 to 1:15, 10:1 to 1:10, 5:1 to 1:5, or 2:1 to 1:2.

In some embodiments, the ratio of Pt in the first catalytic region to Pd in the second catalytic region can be at least 1:200 by weight. In certain embodiments, the ratio of Pt in the first catalytic region to Pd in the second catalytic region can be at least 1:150, 1:100, or 1:75 by weight. In further embodiments, the ratio of Pt in the first catalytic region to Pd in the second catalytic region can at least 1:50, 1:25, 1:20, 1:15, 1:10, 1:8, 1:3, or 1:2. Alternatively, in some embodiments, the ratio of Pt in the first catalytic region to Pd in the second catalytic region can be 200:1 to 1:200, 150:1 to 1:150, 100:1 to 1:100, 75:1 to 1:75, 50:1 to 1:50, 25:1 to 1:25, 20:1 to 1:20, 10:1 to 1:10, 8:1 to 1:8, 3:1 to 1:3, or 2:1 to 1:2.

The first catalytic region can further comprise a first oxygen storage capacity (OSC) material, a first inorganic oxide, or a combination thereof.

The first OSC material can be cerium oxide, zirconium oxide, a ceria-zirconia mixed oxide, an alumina-ceria-zirconia mixed oxide, or a combination thereof. More preferably, the first OSC material comprises the ceria-zirconia mixed oxide, the alumina-ceria-zirconia mixed oxide or a combination thereof. The ceria-zirconia mixed oxide can further comprise dopants, such as lanthanum, neodymium, praseodymium, yttrium oxides, etc. The first OSC material may function as a support material for the first PGM component (e.g., as the first PGM support material). In some embodiments, the first OSC material comprises the ceria-zirconia mixed oxide and the alumina-ceria-zirconia mixed oxide.

The first inorganic oxide is preferably an oxide of Groups 2, 3, 4, 5, 13 and 14 elements. The first inorganic oxide is preferably selected from the group consisting of alumina, magnesia, silica, zirconia, barium oxides, and mixed oxides or composite oxides thereof. Particularly preferably, the first inorganic oxide is alumina, lanthanum-alumina, zirconia, or a magnesia/alumina composite oxide. One especially preferred first inorganic oxide is alumina or lanthanum-alumina.

The first OSC material and the first inorganic oxide can have a weight ratio of no greater than 10:1; preferably, no greater than 8:1 or 5:1; more preferably, no greater than 4:1 or 3:1; most preferably, no greater than 2:1.

Alternatively, the first OSC material and the first inorganic oxide can have a weight ratio of 10:1 to 1:10; preferably, 8:1 to 1:8 or 5:1 to 1:5; more preferably, 4:1 to 1:4 or 3:1 to 1:3; and most preferably, 2:1 to 1:2.

In some embodiments, the first OSC material and the first inorganic oxide can have a weight ratio of no less than 2:1. In further embodiments, the first OSC material and the first inorganic oxide can have a weight ratio of no less than 10:1. In another further embodiments, the first OSC material and the first inorganic oxide can have a weight ratio of no less than 20:1 or no less than 30:1. In yet another further embodiments, the first OSC material and the first inorganic oxide can have a weight ratio of no less than 40:1 or no less than 50:1.

The first catalytic region may further comprise a first alkali or alkaline earth metal.

The first alkali or alkaline earth metal is preferably barium, or strontium, and mixed oxides or composite oxides thereof. Preferably the barium or strontium, where present, is loaded in an amount of 0.1 to 15 wt. %, and more preferably 3 to 10 wt. % of barium or strontium, based on the total weight of the first catalytic region.

Preferably the barium or the strontium is present as $BaCO_3$ or $SrCO_3$. Such a material can be performed by any method known in the art, for example incipient wetness impregnation or spray-drying.

The first catalytic region can extend for 100 percent of the axial length L. (E.g., see FIGS. 1a, 1b, 3a, and 3b).

Figure 2A:
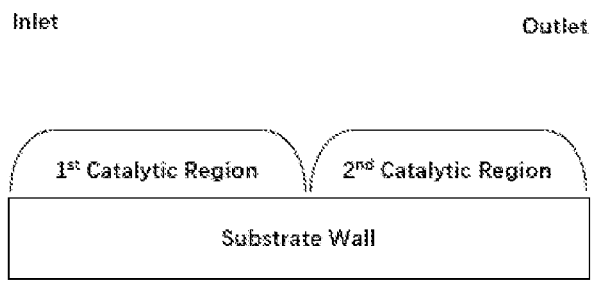
FIG. 2a shows one embodiment according to the present invention, the first catalytic region extends less than 100% of the axial length L, from the inlet end; the second catalytic region extends less than 100% of the axial length L, from the outlet end. The total length of the second and the first catalytic region is equal or less than the axial length L.
Figure 2B:
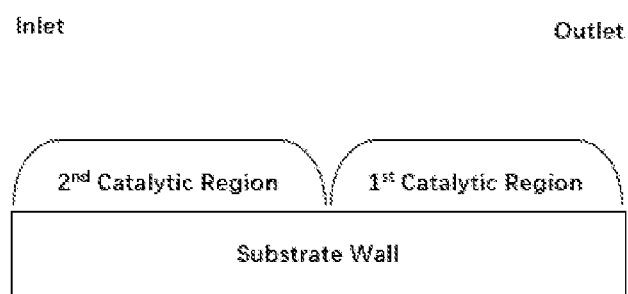
Figure 2C:
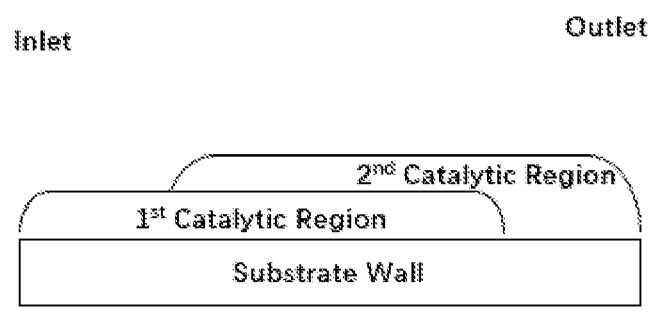
FIG. 2c shows one embodiment according to the present invention, the first catalytic region extends less than 100% of the axial length L, from the inlet end; the second catalytic region extends less than 100% of the axial length L, from the outlet end. The total length of the second and the first catalytic region is greater than the axial length L.

In some embodiments, the first catalytic region can extend for 50 to 95 percent of the axial length L; preferably, for 60 to 90 percent, more preferably, 70 to 90 percent of the axial length L. (E.g., see FIGS. 2c and 2d). In some embodiments, the first catalytic region can extend for 30 to 70 percent of the axial length L; preferably, for 40 to 60 percent, more preferably, 45 to 55 percent of the axial length L. (E.g., see FIGS. 2a, 2b, 3c, and 3d).

Second Catalytic Region

The second PGM component can further comprise Pt.

The second catalytic region can further comprise a second oxygen storage capacity (OSC) material, a second alkali or alkaline earth metal component, and/or a second inorganic oxide.

The second PGM component can be selected from the group consisting of platinum, palladium, rhodium, and a mixture thereof. In some embodiments, the second PGM component can be Pd, Pt, or a mixture thereof.

The second OSC material can be cerium oxide, zirconium oxide, a ceria-zirconia mixed oxide, an alumina-ceria-zirconia mixed oxide, or a combination thereof. More preferably, the second OSC material comprises the ceria-zirconia mixed oxide, the alumina-ceria-zirconia mixed oxide, or a combination thereof. In addition, the second OSC material may further comprise one or more of dopants like lanthanum, neodymium, praseodymium, yttrium etc. Moreover, the second OSC material may have the function as a support material for the second PGM component. In some embodiments, the second OSC material comprises the ceria-zirconia mixed oxide and the alumina-ceria-zirconia mixed oxide.

The ceria-zirconia mixed oxide can have a weight ratio of zirconia to ceria at least 50:50; preferably, higher than 60:40; more preferably, higher than 70:30. Alternatively, the ceria-zirconia mixed oxide also can have a weight ratio of ceria to zirconia less than 50:50, preferably, less than 40:60, more preferably, less than 30:70.

The second OSC material (e.g., ceria-zirconia mixed oxide) can be from 10 to 90 wt. %; preferably, 25-75 wt. %; more preferably, 30-60 wt. %, based on the total washcoat loading of the second catalytic region.

The second OSC material loading in the second catalytic region can be less than 2 $g/in^3$. In some embodiments, the second OSC material loading in the second catalytic region is no greater than 1.5 $g/in^3$, 1.2 $g/in^3$, 1 $g/in^3$, 0.8 $g/in^3$, or 0.7 $g/in^3$.

The second alkali or alkaline earth metal is preferably barium, strontium, mixed oxides or composite oxides thereof. Preferably the barium or strontium, where present, is in an amount of 0.1 to 15 wt. %, and more preferably 3 to 10 wt. % of barium or strontium, based on the total weight of the second catalytic region.

It is even more preferable that the second alkali or alkaline earth metal is strontium. The strontium, where present, is preferably present in an amount of 0.1 to 15 wt. %, and more preferably 3 to 10 wt. %, based on the total weight of the second catalytic region.

It is also preferable that the second alkali or alkaline earth metal is mixed oxides or composite oxide of barium and strontium. Preferably, the mixed oxides or composite oxide of barium and strontium is present in an amount of 0.1 to 15 wt. %, and more preferably 3 to 10 wt. %, based on the total weight of the second catalytic region. It is more preferable that the second alkali or alkaline earth metal is composite oxide of barium and strontium.

Preferably the barium or strontium is present as $BaCO_3$ or $SrCO_3$. Such a material can be performed by any method known in the art, for example incipient wetness impregnation or spray-drying.

The second inorganic oxide is preferably an oxide of Groups 2, 3, 4, 5, 13 and 14 elements. The second inorganic oxide is preferably selected from the group consisting of alumina, magnesia, silica, zirconia, barium oxides, and mixed oxides or composite oxides thereof. Particularly preferably, the second inorganic oxide is alumina, lanthanum-alumina, zirconia, or a magnesia/alumina composite oxide. One especially preferred second inorganic oxide is alumina or lanthanum-alumina.

The second OSC material and the second inorganic oxide can have a weight ratio of no greater than 10:1; preferably, no greater than 8:1 or 5:1; more preferably, no greater than 4:1 or 3:1; most preferably, no greater than 2:1.

Alternatively, the second OSC material and the second inorganic oxide can have a weight ratio of 10:1 to 1:10; preferably, 8:1 to 1:8 or 5:1 to 1:5; more preferably, 4:1 to 1:4 or 3:1 to 1:3; and most preferably, 2:1 to 1:2.

In some embodiments, the second OSC material and the second inorganic oxide can have a weight ratio of no less than 2:1. In further embodiments, the second OSC material and the second inorganic oxide can have a weight ratio of no less than 10:1. In another further embodiments, the second OSC material and the second inorganic oxide can have a weight ratio of no less than 20:1 or no less than 30:1. In yet another further embodiments, the second OSC material and the second inorganic oxide can have a weight ratio of no less than 40:1 or no less than 50:1.

The total washcoat loading of the second catalytic region can be less than 3.5 $g/in^3$; preferably, less than 3.0 $g/in^3$ or 2.5 $g/in^3$. Alternatively, the total washcoat loading of the second catalytic region can be from 0.5 to 3.5 $g/in^3$; preferably, can be from 0.6 to 3 $g/in^3$ or 0.7 to 2.5 $g/in^3$.

The second catalytic region can extend for 100 percent of the axial length L. (E.g., see FIGS. 1a and 1b).

In some embodiments, the second catalytic region can extend for 50 to 95 percent of the axial length L; preferably, for 60 to 90 percent, more preferably, 70 to 90 percent of the axial length L. (E.g., see FIGS. 2c and 2d). In some embodiments, the second catalytic region can extend for 30 to 70 percent of the axial length L; preferably, for 40 to 60 percent, more preferably, 45 to 55 percent of the axial length L. (E.g., see FIGS. 2a, 2b, and 3a-3d).

In some embodiments, the first catalytic region can be supported/deposited directly on the substrate. In certain embodiments, the second catalytic region can be supported/deposited directly on the substrate.

Third Catalytic Region

The catalytic article may further comprise a third catalytic region.

The third catalytic region can further comprise a third PGM component, a third oxygen storage capacity (OSC) material, a third alkali or alkaline earth metal component, and/or a third inorganic oxide.

The third PGM component can be selected from the group consisting of platinum, palladium, rhodium, and a mixture thereof. In further embodiment, the third PGM component can be Pd. In some embodiments, the third PGM component can be Pd, Pt or a mixture thereof.

The third OSC material can be cerium oxide, zirconium oxide, a ceria-zirconia mixed oxide, an alumina-ceria-zirconia mixed oxide, or a combination thereof. More preferably, the third OSC material comprises the ceria-zirconia mixed oxide, the alumina-ceria-zirconia mixed oxide, or a combination thereof. In addition, the third OSC material may further comprise one or more of dopants like lanthanum, neodymium, praseodymium, yttrium etc. Moreover, the third OSC material may have the function as a support material for the third PGM component. In some embodiments, the third OSC material comprises the ceria-zirconia mixed oxide and the alumina-ceria-zirconia mixed oxide.

The ceria-zirconia mixed oxide can have a weight ratio of zirconia to ceria at least 50:50; preferably, higher than 60:40; more preferably, higher than 75:25. Alternatively, the ceria-zirconia mixed oxide also can have a weight ratio of ceria to zirconia less than 50:50; preferably, less than 40:60; more preferably, less than 25:75.

The third OSC material (e.g., ceria-zirconia mixed oxide) can be from 10 to 90 wt. %; preferably, 25-75 wt. %; more preferably, 30-60 wt. %, based on the total washcoat loading of the third catalytic region.

The third OSC material loading in the third catalytic region can be less than 1.5 $g/in^3$. In some embodiments, the third OSC material loading in the second catalytic region is no greater than 1.2 $g/in^3$, 1.0 $g/in^3$, 0.9 $g/in^3$, 0.8 $g/in^3$, or 0.7 $g/in^3$.

The total washcoat loading of the third catalytic region can be less than 3.5 $g/in^3$; preferably, no more than 3.0 $g/in^3$, 2.5 $g/in^3$, or 2 $g/in^3$.

The third alkali or alkaline earth metal is preferably barium, strontium, mixed oxides or composite oxides thereof. Preferably the barium or strontium, where present, is in an amount of 0.1 to 15 wt. %, and more preferably 3 to 10 wt. % of barium or strontium, based on the total weight of the third catalytic region.

It is even more preferable that the third alkali or alkaline earth metal is strontium. The strontium, where present, is preferably present in an amount of 0.1 to 15 wt. %, and more preferably 3 to 10 wt. %, based on the total weight of the third catalytic region.

It is also preferable that the third alkali or alkaline earth metal is mixed oxides or composite oxide of barium and strontium. Preferably, the mixed oxides or composite oxide of barium and strontium is present in an amount of 0.1 to 15 wt. %, and more preferably 3 to 10 wt. %, based on the total weight of the third catalytic region. It is more preferable that the third alkali or alkaline earth metal is composite oxide of barium and strontium.

Preferably the barium or strontium is present as $BaCO_3$ or $SrCO_3$. Such a material can be performed by any method known in the art, for example incipient wetness impregnation or spray-drying.

The third inorganic oxide is preferably an oxide of Groups 2, 3, 4, 5, 13 and 14 elements. The third inorganic oxide is preferably selected from the group consisting of alumina, magnesia, silica, zirconia, barium oxides, and mixed oxides or composite oxides thereof. Particularly preferably, the third inorganic oxide is alumina, lanthanum-alumina, zirconia, or a magnesia/alumina composite oxide. One especially preferred third inorganic oxide is alumina or lanthanum-alumina.

The third OSC material and the third inorganic oxide can have a weight ratio of no greater than 10:1; preferably, no greater than 8:1 or 5:1; more preferably, no greater than 4:1 or 3:1; most preferably, no greater than 2:1.

Alternatively, the third OSC material and the third inorganic oxide can have a weight ratio of 10:1 to 1:10; preferably, 8:1 to 1:8 or 5:1 to 1:5; more preferably, 4:1 to 1:4 or 3:1 to 1:3; and most preferably, 2:1 to 1:2.

In some embodiments, the third OSC material and the third inorganic oxide can have a weight ratio of no less than 2:1. In further embodiments, the third OSC material and the third inorganic oxide can have a weight ratio of no less than 10:1. In another further embodiments, the third OSC material and the third inorganic oxide can have a weight ratio of no less than 20:1 or no less than 30:1. In yet another further embodiments, the third OSC material and the third inorganic oxide can have a weight ratio of no less than 40:1 or no less than 50:1.

The third catalytic region can extend for 100 percent of the axial length L. (E.g., see FIGS. 3c and 3d).

In some embodiments, the third catalytic region can extend for 30 to 70 percent of the axial length L; preferably, for 40 to 60 percent, more preferably, 45 to 55 percent of the axial length L. (E.g., see FIGS. 3a and 3b).

The catalyst article of the invention may comprise further components that are known to the skilled person. For example, the compositions of the invention may further comprise at least one binder and/or at least one surfactant. Where a binder is present, dispersible alumina binders are preferred.

Substrate

Preferably the substrate is a flow-through monolith. Alternatively, the substrate can be a wall-flow filter.

The flow-through monolith substrate has a first face and a second face defining a longitudinal direction there between. The flow-through monolith substrate has a plurality of channels extending between the first face and the second face. The plurality of channels extends in the longitudinal direction and provide a plurality of inner surfaces (e.g. the surfaces of the walls defining each channel). Each of the plurality of channels has an opening at the first face and an opening at the second face. For the avoidance of doubt, the flow-through monolith substrate is not a wall flow filter.

The first face is typically at an inlet end of the substrate and the second face is at an outlet end of the substrate.

The channels may be of a constant width and each plurality of channels may have a uniform channel width.

Preferably within a plane orthogonal to the longitudinal direction, the monolith substrate has from 300 to 900 channels per square inch, preferably from 400 to 800. For example, on the first face, the density of open first channels and closed second channels is from 600 to 700 channels per square inch. The channels can have cross sections that are rectangular, square, circular, oval, triangular, hexagonal, or other polygonal shapes.

The monolith substrate acts as a support for holding catalytic material. Suitable materials for forming the monolith substrate include ceramic-like materials such as cordierite, silicon carbide, silicon nitride, zirconia, mullite, spodumene, alumina-silica magnesia or zirconium silicate, or of porous, refractory metal. Such materials and their use in the manufacture of porous monolith substrates are well known in the art.

It should be noted that the flow-through monolith substrate described herein is a single component (i.e. a single brick). Nonetheless, when forming an emission treatment system, the substrate used may be formed by adhering together a plurality of channels or by adhering together a plurality of smaller substrates as described herein. Such techniques are well known in the art, as well as suitable casings and configurations of the emission treatment system.

In embodiments wherein the catalyst article of the present comprises a ceramic substrate, the ceramic substrate may be made of any suitable refractory material, e.g., alumina, silica, ceria, zirconia, magnesia, zeolites, silicon nitride, silicon carbide, zirconium silicates, magnesium silicates, aluminosilicates and metallo aluminosilicates (such as cordierite and spodumene), or a mixture or mixed oxide of any two or more thereof. Cordierite, a magnesium aluminosilicate, and silicon carbide are particularly preferred.

In embodiments wherein the catalyst article of the present invention comprises a metallic substrate, the metallic substrate may be made of any suitable metal, and in particular heat-resistant metals and metal alloys such as titanium and stainless steel as well as ferritic alloys containing iron, nickel, chromium, and/or aluminium in addition to other trace metals.

Another aspect of the present disclosure is directed to a method for treating a vehicular exhaust gas containing $NO_x$, CO, and HC using the catalyst article described herein. Catalytic converters equipped with the TWC made according to this method show improved catalytic properties compared to conventional TWC (with the same PGM loading), also demonstrated excellent catalytic properties (E.g., see Examples 1-4 and Tables 2, 3, 5, and 7).

Another aspect of the present disclosure is directed to a system for treating vehicular exhaust gas comprising the catalyst article described herein in conjunction with a conduit for transferring the exhaust gas through the system.

Definitions

The term "region" as used herein refers to an area on a substrate, typically obtained by drying and/or calcining a washcoat. A "region" can, for example, be disposed or supported on a substrate as a "layer" or a "zone". The area or arrangement on a substrate is generally controlled during the process of applying the washcoat to the substrate. The "region" typically has distinct boundaries or edges (i.e. it is possible to distinguish one region from another region using conventional analytical techniques).

Typically, the "region" has a substantially uniform length. The reference to a "substantially uniform length" in this context refers to a length that does not deviate (e.g. the difference between the maximum and minimum length) by more than 10%, preferably does not deviate by more than 5%, more preferably does not deviate by more than 1%, from its mean value.

It is preferable that each "region" has a substantially uniform composition (i.e. there is no substantial difference in the composition of the washcoat when comparing one part of the region with another part of that region). Substantially uniform composition in this context refers to a material (e.g., region) where the difference in composition when comparing one part of the region with another part of the region is 5% or less, usually 2.5% or less, and most commonly 1% or less.

The term "zone" as used herein refers to a region having a length that is less than the total length of the substrate, such as ≤75% of the total length of the substrate. A "zone" typically has a length (i.e. a substantially uniform length) of at least 5% (e.g. ≥5%) of the total length of the substrate.

The total length of a substrate is the distance between its inlet end and its outlet end (e.g. the opposing ends of the substrate).

Any reference to a "zone disposed at an inlet end of the substrate" used herein refers to a zone disposed or supported on a substrate where the zone is nearer to an inlet end of the substrate than the zone is to an outlet end of the substrate. Thus, the midpoint of the zone (i.e. at half its length) is nearer to the inlet end of the substrate than the midpoint is to the outlet end of the substrate. Similarly, any reference to a "zone disposed at an outlet end of the substrate" used herein refers to a zone disposed or supported on a substrate where the zone is nearer to an outlet end of the substrate than the zone is to an inlet end of the substrate. Thus, the midpoint of the zone (i.e. at half its length) is nearer to the outlet end of the substrate than the midpoint is to the inlet end of the substrate.

When the substrate is a wall-flow filter, then generally any reference to a "zone disposed at an inlet end of the substrate" refers to a zone disposed or supported on the substrate that is:

(a) nearer to an inlet end (e.g. open end) of an inlet channel of the substrate than the zone is to a closed end (e.g. blocked or plugged end) of the inlet channel, and/or (b) nearer to a closed end (e.g. blocked or plugged end) of an outlet channel of the substrate than the zone is to an outlet end (e.g. open end) of the outlet channel.

Thus, the midpoint of the zone (i.e. at half its length) is (a) nearer to an inlet end of an inlet channel of the substrate than the midpoint is to the closed end of the inlet channel, and/or (b) nearer to a closed end of an outlet channel of the substrate than the midpoint is to an outlet end of the outlet channel.

Similarly, any reference to a "zone disposed at an outlet end of the substrate" when the substrate is a wall-flow filter refers to a zone disposed or supported on the substrate that is:

(a) nearer to an outlet end (e.g. an open end) of an outlet channel of the substrate than the zone is to a closed end (e.g. blocked or plugged) of the outlet channel, and/or (b) nearer to a closed end (e.g. blocked or plugged end) of an inlet channel of the substrate than it is to an inlet end (e.g. an open end) of the inlet channel.

Thus, the midpoint of the zone (i.e. at half its length) is (a) nearer to an outlet end of an outlet channel of the substrate than the midpoint is to the closed end of the outlet channel, and/or (b) nearer to a closed end of an inlet channel of the substrate than the midpoint is to an inlet end of the inlet channel.

A zone may satisfy both (a) and (b) when the washcoat is present in the wall of the wall-flow filter (i.e. the zone is in-wall).

The term "washcoat" is well known in the art and refers to an adherent coating that is applied to a substrate usually during production of a catalyst.

The acronym "PGM" as used herein refers to "platinum group metal". The term "platinum group metal" generally refers to a metal selected from the group consisting of Ru, Rh, Pd, Os, Ir and Pt, preferably a metal selected from the group consisting of Ru, Rh, Pd, Ir and Pt. In general, the term "PGM" preferably refers to a metal selected from the group consisting of Rh, Pt and Pd.

The term "mixed oxide" as used herein generally refers to a mixture of oxides in a single phase, as is conventionally known in the art. The term "composite oxide" as used herein generally refers to a composition of oxides having more than one phase, as is conventionally known in the art.

The expression "consist essentially" as used herein limits the scope of a feature to include the specified materials or steps, and any other materials or steps that do not materially affect the basic characteristics of that feature, such as for example minor impurities. The expression "consist essentially of" embraces the expression "consisting of".

The expression "substantially free of" as used herein with reference to a material, typically in the context of the content of a region, a layer or a zone, means that the material in a minor amount, such as ≤5% by weight, preferably ≤2% by weight, more preferably ≤1% by weight. The expression "substantially free of" embraces the expression "does not comprise."

The expression "essentially free of" as used herein with reference to a material, typically in the context of the content of a region, a layer or a zone, means that the material in a trace amount, such as ≤1% by weight, preferably ≤0.5% by weight, more preferably ≤0.1% by weight. The expression "essentially free of" embraces the expression "does not comprise."

Any reference to an amount of dopant, particularly a total amount, expressed as a % by weight as used herein refers to the weight of the support material or the refractory metal oxide thereof.

The term "loading" as used herein refers to a measurement in units of $g/ft^3$ on a metal weight basis.

The following examples merely illustrate the invention. Those skilled in the art will recognize many variations that are within the spirit of the invention and scope of the claims.

EXAMPLES

Comparative Catalyst A:
First Catalytic Region:
The first catalytic region consists of Rh supported on a washcoat of CeZr mixed oxide and La-stabilized alumina. The washcoat loading of the first catalytic region was about 1.3 $g/in^3$ with a Rh loading of 8 $g/ft^3$.

The first washcoat was then coated from the outlet face of the ceramic substrate containing the second catalytic region from below, using standard coating procedures with total coating depth targeted of 80% of the substrate length, dried at 100° C. and calcined at 500° C. for 45 mins.

Second Catalytic Region:
The second catalytic region consists of Pd supported on a washcoat of CeZr mixed oxide, La-stabilized alumina and barium carbonate. The washcoat loading of the second catalytic region was about 1.8 $g/in^3$ with a Pd loading of 42 $g/ft^3$.

This washcoat was then coated from the inlet face of a ceramic substrate (600 cpsi, 4.3 mil wall thickness) using standard coating procedures with coating depth targeted of 80% of the substrate length, dried at 100° C.

Figure 2D:
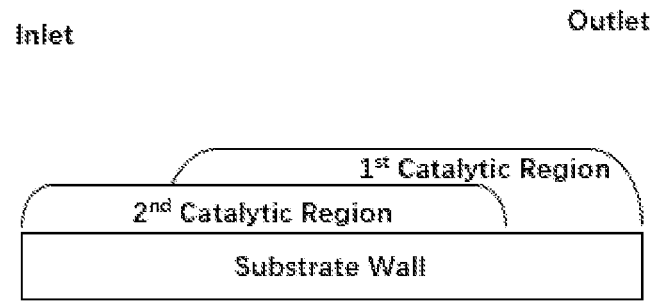
FIG. 2d depicts a variation of FIG. 2c.

The configuration of Comparative Catalyst A is shown in FIG. 2d.

Catalyst B:
Catalyst B was prepared according to the similar procedure as Comparative Catalyst A with the exception that the washcoat loading of the second catalytic region was about 1.8 $g/in^3$ with a Pd loading of 38 $g/ft^3$, and the washcoat loading of the first catalytic region was about 1.3 $g/in^3$ with a Rh loading of 8 $g/ft^3$ and a Pt loading of 4 $g/ft^3$.

Catalyst C:
Catalyst C was prepared according to the similar procedure as Comparative Catalyst A with the exception that the washcoat loading of the second catalytic region was about 1.8 $g/in^3$ with a Pd loading of 34 $g/ft^3$, and the washcoat loading of the second catalytic region was 1.3 $g/in^3$ with a Rh loading of 8 $g/ft^3$ and a Pt loading of 8 $g/ft^3$.

TABLE 1

PGM loadings in Comparative Catalyst A and Catalysts B and C

| | 1st Catalytic Region | | | 2nd Catalytic Region | |
|---|---|---|---|---|---|
| | Rh (g/ft³) | Pt (g/ft³) | Pt: Rh Ratio (wt.) | Pd (g/ft³) | Pt: Pd ratio (wt.) |
| Comparative Catalyst A | 8 | 0 | 0 | 42 | 0 |
| Catalyst B | 8 | 4 | 1:2 | 38 | 1:9.5 |
| Catalyst C | 8 | 8 | 1:1 | 34 | 1:4.25 |

As shown in Table 1, the PGM loadings in Catalysts B and C were modified based on Comparative Catalyst A. In Catalyst B, 4 g/ft³ of Pd in the $2^{nd}$ catalytic region of Comparative Catalyst A was replaced with 4 g/ft³ of Pt then Pt was relocated to the $1^{st}$ catalytic region. Similarly, in Catalyst C, 8 g/ft³ of Pd in the $2^{nd}$ catalytic region of Comparative Catalyst A was replaced with 8 g/ft³ of Pt then Pt was relocated to the $1^{st}$ catalytic region. These catalyst designs offer cost effective formulations based on current PGM pricing and trend.

Example 1: Vehicle Testing Procedures and Results

The fresh samples of Comparative Catalyst A and Catalyst C were tested over a vehicle of 1.5-liter engine with Worldwide Light Duty Testing Procedure (WLTP). Results of vehicle exhaust diluted bag data are shown in Table 2.

In addition to the cost saving due to inventors' catalyst formulation design, surprisingly, Catalyst C of the present invention also presented excellent activity on $NO_x$ emission control, compared with Comparative Catalyst A (e.g., see the $NO_x$ performance improved with around 27%).

TABLE 2

Results of Emissions by Vehicle Diluted Bag Data

| | Exhaust Emissions (mg/km) | | | |
|---|---|---|---|---|
| | THC | NMHC | CO/10 | $NO_x$ |
| Comparative Catalyst A | 23 | 20 | 28 | 62 |
| Catalyst C | 19 | 16 | 28 | 45 |

Example 2: Vehicle Testing Procedures and Results

The fresh and bench aged samples of Comparative Catalyst A and Catalysts B and C were tested over another vehicle with 1.5-liter turbo engine with WLTP. The bench aging is under 6.1-L engine in the same run for 150 hrs with four mode aging cycle, with peak bed temperature at about 980° C. in the catalysts. Results of vehicle exhaust diluted bag data are shown in Table 3.

In addition to the cost saving due to inventors' catalyst formulation design, surprisingly, Catalysts B and C of the present invention presented excellent activity on $NO_x$ emission control, compared with Comparative Catalyst A (e.g., see the $NO_x$ performance improved with around 25% and 50% respectively over the fresh parts). After bench aging, Catalyst B still gave comparable performances, compared with Comparative Catalyst A (even some improvement on THC/NMHC and CO performances).

TABLE 3

Results of Emissions by Vehicle Diluted Bag Data

| | Exhaust Emissions (mg/km) | | | |
|---|---|---|---|---|
| | THC | NMHC | CO/10 | $NO_x$ |
| Comparative Catalyst A-Fresh | 19 | 17 | 13 | 28 |
| Catalyst B-Fresh | 20 | 18 | 15 | 21 |
| Catalyst C-Fresh | 18 | 17 | 19 | 14 |
| Comparative Catalyst A-Aged | 43 | 34 | 36 | 67 |
| Catalyst B-Aged | 40 | 30 | 34 | 68 |
| Catalyst C-Aged | 43 | 32 | 49 | 62 |

Comparative Catalyst D:

Second Catalytic Region:

The second catalytic region consists of Pd supported on a washcoat of CeZr mixed oxide, La-stabilized alumina and barium carbonate. The washcoat loading of the second catalytic region was about 2.3 g/in³ with a Pd loading of 54 g/ft³.

This washcoat was then coated from the inlet face of a ceramic substrate (600 cpsi, 2.5 mil wall thickness) using standard coating procedures with coating depth targeted of 50% of the substrate length, dried at 100° C. and calcined at 500° C. for 45 mins.

Third Catalytic Region:

The third catalytic region consists of Pd supported on a washcoat of CeZr mixed oxide, La-stabilized alumina and barium carbonate. The washcoat loading of the third catalytic region was about 2.3 g/in³ with a Pd loading of 14 g/ft³.

The washcoat was then coated from the outlet face of the ceramic substrate containing the second catalytic region from above, using standard coating procedures with total coating depth targeted of 50% of the substrate length, dried at 100° C. and calcined at 500° C. for 45 mins.

First Catalytic Region:

The first catalytic region consists of Rh supported on a washcoat of CeZr mixed oxide and La-stabilized alumina. The washcoat loading of the first catalytic region was about 1.5 g/in³ with a Rh loading of 6 g/ft³.

The first washcoat was then coated from the outlet face of the ceramic substrate containing the second and the third catalytic regions from above, using standard coating procedures with total coating depth targeted of 100% of the substrate length, dried at 100° C. and calcined at 500° C. for 45 mins.

Figure 3A:
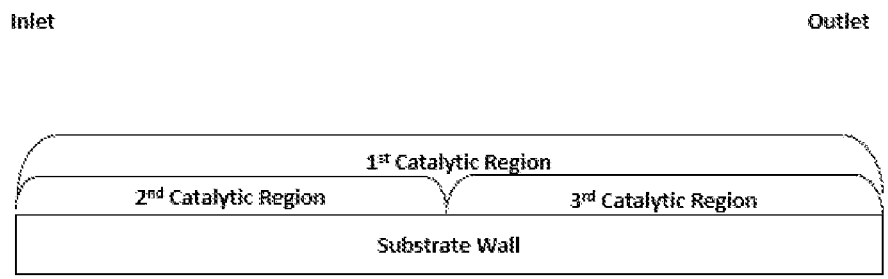
FIG. 3a shows one embodiment according to the present invention, the second catalytic region extends less than 100% of the axial length L, from the inlet end; the third catalytic region extends less than 100% of the axial length L, from the outlet end. The total length of the second and the third catalytic region is less than or equal to the axial length L, while in some embodiments, the total length of the second and the third catalytic region can be longer than the axial with overlaps between the second and third catalytic region. The first catalytic region extends 100% of the axial length L and overlies the second and third catalytic regions as top layer.
Figure 3B:
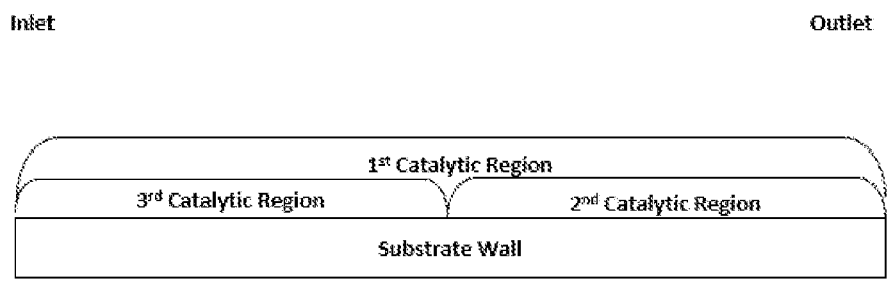
Figure 3C:
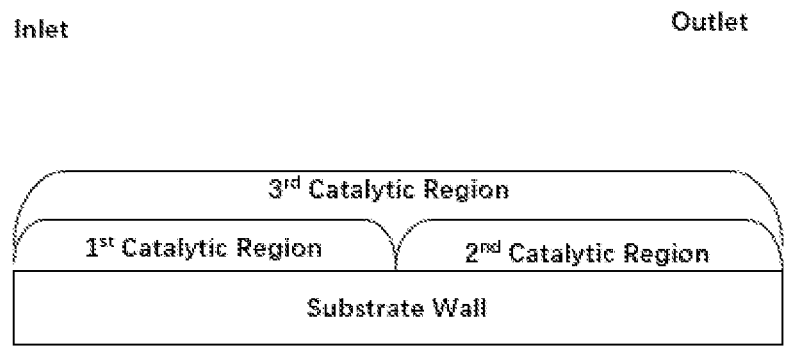
Figure 3D:
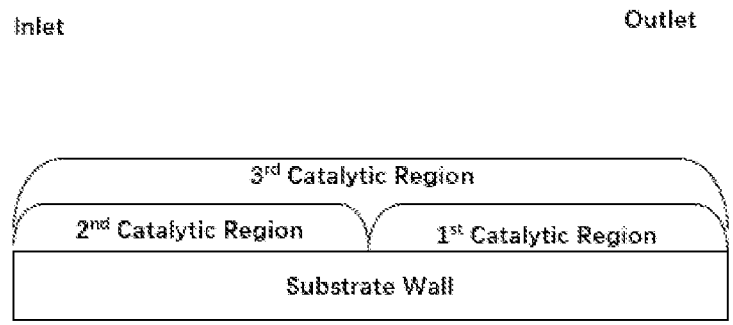

The configuration of Comparative Catalyst D is shown in FIG. 3a and the coating order is second catalytic region, third catalytic region, then first catalytic region.

Catalyst E:

Catalyst E was prepared according to the similar procedure as Comparative Catalyst D with the exception that the washcoat loading of the second catalytic region was about 2.3 g/in³ with a Pd loading of 50 g/ft³, the washcoat loading of the third catalytic region was 2.3 g/in³ with a Pd loading of 10 g/ft³, and the washcoat loading of the first catalytic region was 1.5 g/in³ with a Rh loading of 6 g/ft³ and a Pt loading of 4 g/ft³

TABLE 4

PGM loadings in Comparative Catalyst D and Catalyst E

| | 1st Catalytic Region | | | 2nd Cat. Region Pd (g/ft³) | 3rd Cat. Region Pd (g/ft³) | Pt (1st Cat. Region):Pd (2nd Cat. Region) ratio (wt.) |
|---|---|---|---|---|---|---|
| | Rh (g/ft³) | Pt (g/ft³) | Pt:Rh Ratio (wt.) | | | |
| Comparative Catalyst D | 6 | 0 | 0 | 54 | 14 | 0 |
| Catalyst E | 6 | 4 | 1:2 | 50 | 10 | 1:12.5 |

As shown in Table 4, the PGM loadings in Catalyst E were modified based on Comparative Catalyst D. In Catalyst E, 4 g/ft³ of Pd in both the second catalytic region and the third catalytic region of Comparative Catalyst D was replaced with 4 g/ft³ of Pt then Pt was relocated to the first catalytic region. These catalyst designs offer cost effective formulations based on current PGM pricing and trend.

Example 3: Vehicle Testing Procedures and Results

The fresh Comparative Catalyst D and Catalyst E were tested over a vehicle of 1.5-liter engine with WLTP. Results of vehicle exhaust diluted bag data are shown in Table 5.

In addition to the cost saving due to inventors' catalyst formulation design, surprisingly, Catalyst E of the present invention presented excellent activity on $NO_x$ emission control, compared with Comparative Catalyst D (e.g., see the $NO_x$ performance improved with around 36%).

TABLE 5

Results of Emissions by Vehicle Diluted Bag Data

| | Exhaust Emissions (mg/km) | | | |
|---|---|---|---|---|
| | THC | NMHC | CO/10 | $NO_x$ |
| Comparative Catalyst D | 19 | 16 | 12 | 35 |
| Catalyst E | 17 | 14 | 14 | 22 |

Comparative Catalyst F:
Second Catalytic Region:

The second catalytic region consists of Pd supported on a washcoat of CeZr mixed oxide, La-stabilized alumina and barium carbonate. The washcoat loading of the second catalytic region was about 2.1 g/in³ with a Pd loading of 74 g/ft³.

This washcoat was then coated from the inlet face of a ceramic substrate (600 cpsi, 2.5 mil wall thickness) using standard coating procedures with coating depth targeted of 50% of the substrate length, dried at 100° C. and calcined at 500° C. for 45 mins.

Third Catalytic Region:

The third catalytic region consists of Pd supported on a washcoat of CeZr mixed oxide, La-stabilized alumina and barium carbonate. The washcoat loading of the third catalytic region was about 2.1 g/in³ with a Pd loading of 24 g/ft³.

The washcoat was then coated from the outlet face of the ceramic substrate containing the second catalytic region from above, using standard coating procedures with total coating depth targeted of 50% of the substrate length, dried at 100° C. and calcined at 500° C. for 45 mins.

First Catalytic Region:

The first catalytic region consists of Rh supported on a washcoat of CeZr mixed oxide and La-stabilized alumina. The washcoat loading of the first catalytic region was about 1.3 g/in³ with a Rh loading of 6 g/ft³.

The washcoat was then coated from the outlet face of the ceramic substrate containing the second and the third catalytic regions from above, using standard coating procedures with total coating depth targeted of 100% of the substrate length, dried at 100° C. and calcined at 500° C. for 45 mins.

The configuration of Comparative Catalyst F is shown in FIG. 3a and the coating order is second catalytic region, third catalytic region, then first catalytic region.

Catalyst G:

Catalyst G was prepared according to the similar procedure as Comparative Catalyst F with the exception that the washcoat loading of the first catalytic region was about 1.3 g/in³ with a Rh loading of 5 g/ft³ and a Pt loading of 1 g/ft³.

TABLE 6

PGM loadings in Comparative Catalyst F and Catalyst G

| | 1st Catalytic Region | | | 2nd Cat. Region Pd (g/ft³) | 3rd Cat. Region Pd (g/ft³) | Pt (1st Cat. Region):Pd (2nd Cat. Region) ratio (wt.) |
|---|---|---|---|---|---|---|
| | Rh (g/ft³) | Pt (g/ft³) | Pt:Rh Ratio (wt.) | | | |
| Comparative Catalyst F | 6 | 0 | 0 | 74 | 24 | 0 |
| Catalyst G | 5 | 1 | 1:5 | 74 | 24 | 1:74 |

As shown in Table 6, the PGM loadings in Catalyst G were modified based on Comparative Catalyst F. In Catalyst G, 1 g/ft³ of Rh in the first catalytic region of Comparative Catalyst F was replaced with 1 g/ft³ of Pt in the first catalytic region. These catalyst designs offer cost effective formulations based on current PGM pricing and trend.

Example 4: Vehicle Testing Procedures and Results

The bench aged samples of Comparative Catalyst F and Catalyst G were tested over a vehicle of 1.5-liter engine with WLTP. The bench aging is under 6.1-L engine in the same run for 200 hrs with four mode aging cycle, with peak bed temperature at about 980° C. in the catalysts. Results of vehicle exhaust diluted bag data over bench aged parts are shown in Table 7.

In addition to the cost saving due to inventors' catalyst formulation design, Catalyst G of the present invention still presented comparative performances for all emissions, compared with Comparative Catalyst F.

TABLE 7

Results of Emissions by Vehicle Diluted Bag Data

| | Exhaust Emissions (mg/km) | | | |
|---|---|---|---|---|
| | THC | NMHC | CO/10 | $NO_x$ |
| Comparative Catalyst F | 51 | 36 | 69 | 28 |
| Catalyst G | 58 | 40 | 66 | 27 |

We claim:

1. A catalytic article for treating exhaust gas from a gasoline engine comprising:

a substrate comprising an inlet end and an outlet end with an axial length L;

a first catalytic region comprising a first platinum group metal (PGM) component, wherein the first PGM component comprises Rh and Pt;

a second catalytic region comprising a second PGM component, wherein the second PGM component comprises Pd;

wherein the first PGM component has a Pt to Rh ratio of at least 1:20 by weight;

wherein the ratio of Pt in the first catalytic region to Pd in the second catalytic region is at least 1:200 by weight; and wherein the substrate is a flow through monolith.

2. The catalytic article of claim 1, wherein the ratio of Pt in the first catalytic region to Pd in the second catalytic region is 200:1 to 1:200 by weight.

3. The catalytic article of claim 1, wherein the first catalytic region further comprises a first oxygen storage capacity (OSC) material, a first inorganic oxide, or a combination thereof.

4. The catalytic article of claim 3, wherein the first OSC material is cerium oxide, a ceria-zirconia mixed oxide, an alumina-ceria-zirconia mixed oxide, or a combination thereof.

5. The catalytic article of claim 3, wherein the first inorganic oxide is selected from the group consisting of alumina, magnesia, silica, zirconia, lanthanum, neodymium, praseodymium, yttrium oxides, and mixed oxides or composite oxides thereof.

6. The catalytic article of claim 1, wherein the second catalytic region further comprises a second OSC material, a second inorganic oxide, or a combination thereof.

7. The catalytic article of claim 6, wherein the second OSC material is cerium oxide, zirconium oxide, a ceria-zirconia mixed oxide, an alumina-ceria-zirconia mixed oxide or a combination thereof.

8. The catalytic article of claim 6, wherein the second inorganic oxide is selected from the group consisting of alumina, magnesia, silica, zirconia, lanthanum, cerium, neodymium, praseodymium, yttrium oxides, and mixed oxides or composite oxides thereof.

9. The catalytic article of claim 1, wherein the ratio of Pt in the first catalytic region to Pd in the second catalytic region is 75:1 to 1:75.

10. The catalytic article of claim 9, wherein the first PGM component has a Pt to Rh ratio of 20:1 to 1:20.

11. The catalytic article of claim 1, wherein the first catalytic region extends for the axial length L.

12. The catalytic article of claim 1, wherein the second catalytic region extends for the axial length L.

13. The catalytic article of claim 1, wherein the first catalytic region is supported/deposited directly on the substrate.

14. The catalytic article of claim 1, wherein the second catalytic region is supported/deposited directly on the substrate.

15. The catalytic article of claim 1, wherein the first catalytic region extends for less than the axial length L.

16. The catalytic article of claim 1, wherein the second catalytic region extends for less than the axial length L.

17. The catalytic article of claim 1, further comprising a third catalytic region.

18. The catalytic article of claim 17, wherein the third catalytic region comprises a third PGM component.

19. The catalytic article of claim 18, wherein the third PGM component is selected from the group consisting of platinum, palladium, rhodium, and a mixture thereof.

20. The catalytic article of claim 19, wherein the third PGM component comprises Pd.

* * * * *